United States Patent
Sinha et al.

(10) Patent No.: US 11,425,012 B2
(45) Date of Patent: Aug. 23, 2022

(54) DYNAMICALLY GENERATING VISUALIZATIONS OF DATA BASED ON CORRELATION MEASURES AND SEARCH HISTORY

(71) Applicant: Citrix Systems, Inc., Fort Lauderdale, FL (US)

(72) Inventors: Ishita Sinha, Bengaluru (IN); Syed Mansoor Pasha, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/722,575

(22) Filed: Dec. 20, 2019

(65) Prior Publication Data

US 2021/0194783 A1 Jun. 24, 2021

(51) Int. Cl.
| | |
|---|---|
| *H04L 43/0817* | (2022.01) |
| *H04L 43/0811* | (2022.01) |
| *G06F 16/22* | (2019.01) |
| *H04L 41/22* | (2022.01) |
| *H04L 43/067* | (2022.01) |

(52) U.S. Cl.
CPC ........ *H04L 43/0817* (2013.01); *G06F 16/221* (2019.01); *H04L 41/22* (2013.01); *H04L 43/067* (2013.01); *H04L 43/0811* (2013.01)

(58) Field of Classification Search
CPC ... H04L 43/0817; H04L 43/067; H04L 41/22; H04L 43/0811; G06F 16/221
See application file for complete search history.

(56) References Cited

U.S. PATENT DOCUMENTS

| | | | |
|---|---|---|---|
| 6,928,472 B1* | 8/2005 | Wen ................... | H04L 41/5009 370/241 |
| 10,015,543 B1* | 7/2018 | Peterkofsky ..... | H04N 21/44218 |
| 10,594,542 B2* | 3/2020 | Jeyakumar .......... | H04L 41/0631 |
| 2011/0060703 A1* | 3/2011 | Alaniz ............... | G06K 9/00496 706/12 |
| 2016/0092516 A1* | 3/2016 | Poola ................. | G06F 16/2379 707/776 |
| 2016/0323157 A1* | 11/2016 | Marvasti ............ | G06F 11/3452 |
| 2017/0031742 A1* | 2/2017 | Jilani .................. | G06F 11/0787 |
| 2020/0267057 A1* | 8/2020 | Garvey ................ | H04L 43/08 |
| 2020/0341833 A1* | 10/2020 | Poghosyan .......... | G06F 11/301 |

* cited by examiner

*Primary Examiner* — Philip C Lee
(74) *Attorney, Agent, or Firm* — Foley & Lardner LLP

(57) ABSTRACT

Described embodiments provide systems and methods for generating visualizations of data based on correlation measures and search history. An analysis engine may access data observed from a data source over time. The analysis engine may determine a variation of each of at least a first metric and a second metric of the data, over time. A correlation engine may determine a correlation measure between the first metric and a second metric, over time. The correlation engine may generate, responsive to the correlation measure being greater than a reference level, a visualization of the first metric and the second metric varying in time, on a device to display to a user.

19 Claims, 7 Drawing Sheets

DYNAMICALLY GENERATING VISUALIZATIONS OF DATA BASED ON CORRELATION MEASURES AND SEARCH HISTORY

FIELD OF THE DISCLOSURE

The present application generally relates to interfaces to present data, including but not limited to systems and methods for generating visualizations of data based on correlation measures and/or search history.

BACKGROUND

An application running on a computing device may aggregate time-series data from various sources of data. The aggregated data may be displayed via a display of the computing device using one or more graphical user interfaces. These interfaces may be pre-set and pre-configured on the application.

BRIEF SUMMARY

The present disclosure is directed towards systems and methods for generating visualizations of data based on correlation measures and search history. Raw data in the form of time-series data may be gathered from various sources. A myriad of analytical techniques may be applied to the raw data to calculate a variety of measures (e.g., statistical measures). Time-series data can comprise data points with associated time information, such as data points indexed, arranged, stored, listed and/or graphed in time order. The data themselves or the measures determined therefrom may also be processed to facilitate presentation of the data. An application running on a computing device may present the data and the related measures by generating an assortment of graphical plots (e.g., bar graphs, line graphs, and charts) and rendering the plots via a graphical user interface (also referred sometimes herein as a dashboard).

The assortment of plots and the interfaces used to display the data may be fixed to a predefined set in the application, with each interface designed to render a different graphical plot of the data. For example, a developer of the application may manually configure the application to process the data in a specified manner, generate a certain set of plots, and include a particular set of interfaces for the plot(s) in accordance with the stipulations of the developer or a user. Once the application is configured and provided to the user's computing device, the user may navigate through the interfaces of the application to view the desired graphical plot of the data. The application may process the data, generate the graphical plot, and display via the indicated interface.

Since the application may be preconfigured with a fixed set of graphical plots and interface, the number of different visualizations of the data and related measures displayable by the application may also be fixed. For example, a new source of data for the user may entail the creation of a new pipeline to process the data, a new graphical plot to present the data, and a new set of interfaces to display the graphical plots. Every time a different graphical plot is desired, the user may request the developer to manually update the application for the desired set of plots and interfaces. This process may iterate several times over, going back and forth between the developer and the user. Once the specifications are finalized, the developer may compose the program code for the application, design and test customized interfaces, and deliver the updated application to the user. This back-and-forth process to generate customized interfaces may be labor intensive, entailing extensive manual efforts and specialized domain knowledge for particular sets of data by both the part of the application developer and the user of the application. Moreover, because the updated application produced as a result of this process is still fixed after customization, the application may continue to suffer from the same issues in presenting the data and related measures. These may lead to a degradation to the human-computer interaction (HCI) between the user and the application for processing and presenting the data.

To address these and other technical challenges in processing the data for presentation, a data visualization platform may perform analytics on the data, identify user interactions with the previous interfaces, and/or generate new interfaces to display new plots. The platform may store and maintain raw data accumulated over time into a columnar storage to facilitate time-series analysis. Each of the time-series data may be associated with a particular dimension or metric. For example, one set of time-series data may include values for return trip time of packets communicated through a network, while another set of time-series data may include values for measuring latency time for packets exchanged across the network. Each set of time-series data may be arranged into columns (and/or rows) and indexed by time on the columnar storage.

As the raw data is gathered, the platform may calculate correlation coefficients across the sets of time-series data to determine whether any dataset (from the sets of time-series data) is correlated with another dataset. For instance, in a single data source of data, a first metric and a second metric may show an increase or a decrease in dependency over a significantly large time range containing a large distribution of data. For these two metrics, the correlation coefficient may be relatively higher than that of other metrics without such a dependency. Datasets from multiple metrics with higher correlation coefficients may be contenders to be presented within a single graphical plot (or multiple graphical plots) on an interface of the application. Conversely, datasets from differing metrics with lower correlation coefficients may be removed from the candidates for presentation through one of the interfaces. The application of the platform may also include an initial set of interfaces to present one of a number of pre-specified graphical plots of data.

In addition, there may be a feedback loop between the application on the end-user computing device, and the platform carrying search queries made by the user via the application for certain datasets. Using the search queries, the platform may further refine which graphical plots (e.g., which metrics) are to be presented via the interfaces of the application to the user. For example, the number of search queries submitted via the application for (or related to) a first metric may be greater than the number of search metrics for (or related to) a second metric. Based on the difference between the numbers, the platform may weigh generating a graphical plot showing the first metric with another metric as a higher contender than generating a graphical plot showing the second metric with another metric. With both the correlation coefficients and the number of search queries, the platform may determine which graphical plots, metrics and/or interfaces are to be displayed, and the updating of the application may occur in near real-time.

In this manner, the data visualization platform may reduce and eliminate the involvement of extensive manual efforts and domain knowledge for the data by the application developer and the user. Furthermore, the whole iterative, back-and-forth process of designing, modeling, testing, querying over the feedback may be alleviated and removed, with no change to the programming code underlying the application. As a result, new sources of data may be quickly incorporated into the platform for consumption, analysis and/or presentation through one of the interfaces of the application. The data visualization platform thus may provide visualizations of data dynamically based on correlation coefficients calculated across various datasets from different metrics and/or on user search queries for specified datasets. This may increase the quality of HCI between the user and the application in retrieving and presenting the desired sets of data.

At least one aspect of this disclosure is directed to a method. An analysis engine may access data observed from a data source over time. The analysis engine may determine a variation of each of at least a first metric and a second metric of the data, over time. A correlation engine may determine a correlation measure between the first metric and a second metric, over time. The correlation engine may generate, responsive to the correlation measure being greater than a reference level, a visualization of the first metric and the second metric varying in time, on a device to display to a user.

In some embodiments, the analysis engine may detect that the data source comprises a new data source. In some embodiments, the correlation engine may dynamically generate, responsive to the new data source, the visualization of the first metric and the second metric varying in time, to display to the user.

In some embodiments, the analysis engine may access the data observed from the data source over time, from a columnar database. In some embodiments, the analysis engine may determine a variation of a third metric of the data over time. In some embodiments, the correlation engine may determine whether a correlation measure between the first metric and the third metric over time, is less than the correlation measure between the first metric and the second metric over time.

In some embodiments, the correlation engine may generate, responsive to the correlation measure between the first metric and the third metric being less than the correlation measure between the first metric and the second metric, the visualization of the first metric and the second metric varying in time, to display to a user.

In some embodiments, the correlation engine may generate, responsive to the correlation measure between the first metric and the third metric over time being higher than the correlation measure between the first metric and the second metric over time, a visualization of the first metric and the third metric varying in time, to display to the user.

In some embodiments, the reference level may include a predefined value, or a correlation measure between another pair of metrics of the data. In some embodiments, a monitoring engine may detect that the data source is a new data source. In some embodiments, the monitoring engine may store the data from the data source over time.

In some embodiments, a feedback engine may detect that a behavior of the user is indicative of insufficient interest in the visualization of the first metric and the second metric varying in time. In some embodiments, the feedback engine may indicate to the correlation engine, to refrain from displaying the visualization of the first metric and the second metric at a future time, or to display a different visualization at the future time.

In some embodiments, the behavior of the user may include at least one of: dismissing or minimizing the displayed visualization, performing a search unrelated to the first metric or the second metric, or a lack of interaction with the displayed visualization.

Another aspect of this disclosure is directed to a device. The device may include memory configured to store data observed from a data source over time. The device may include at least one processor. The at least one processor may access data observed from a data source over time. The at least one processor may determine a variation of each of at least a first metric and a second metric of the data, over time. The at least one processor may determine a correlation measure between the first metric and a second metric, over time. The at least one processor may generate, responsive to the correlation measure being greater than a reference level, a visualization of the first metric and the second metric varying in time, to display to a user.

In some embodiments, the at least one processor may detect that the data source comprises a new data source. In some embodiments, the at least one processor may dynamically generate, responsive to the new data source, the visualization of the first metric and the second metric varying in time, to display to the user.

In some embodiments, the memory may store the data in a columnar database. In some embodiments, the at least one processor may access the data observed from the data source over time, from a columnar database.

In some embodiments, the at least one processor may determine a variation of a third metric of the data over time. In some embodiments, the at least one processor may determine whether a correlation measure between the first metric and the third metric over time, is less than the correlation measure between the first metric and the second metric over time.

In some embodiments, the at least one processor may generate, responsive to the correlation measure between the first metric and the third metric being less than the correlation measure between the first metric and the second metric, the visualization of the first metric and the second metric varying in time, to display to a user In some embodiments, the at least one processor may generate, responsive to the correlation measure between the first metric and the third metric being higher than the correlation measure between the first metric and the second metric, a visualization of the first metric and the third metric varying in time, to display to the user.

In some embodiments, the reference level may include a predefined value, or a correlation measure between another pair of metrics of the data. In some embodiments, the at least one processor may detect that the data source is a new data source. In some embodiments, the at least one processor may store the data from the data source over time.

In some embodiments, the at least one processor may detect that an behavior of the user is indicative of insufficient interest in the visualization of the first metric and the second metric varying in time. In some embodiments, the at least one processor may refrain from displaying the visualization of the first metric and the second metric at a future time, or display a different visualization at the future time.

Another aspect of this disclosure is directed to a non-transitory computer readable medium storing program instructions. The instruction may cause one or more processors to access data observed from a data source over time. The instruction may cause the one or more processors to determine a variation of each of at least a first metric and a second metric of the data, over time. The instruction may cause the one or more processors to determine a correlation measure between the first metric and a second metric, over time. The instruction may cause the one or more processors to generate, responsive to the correlation measure being greater than a reference level, a visualization of the first metric and the second metric varying in time, to display to a user.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
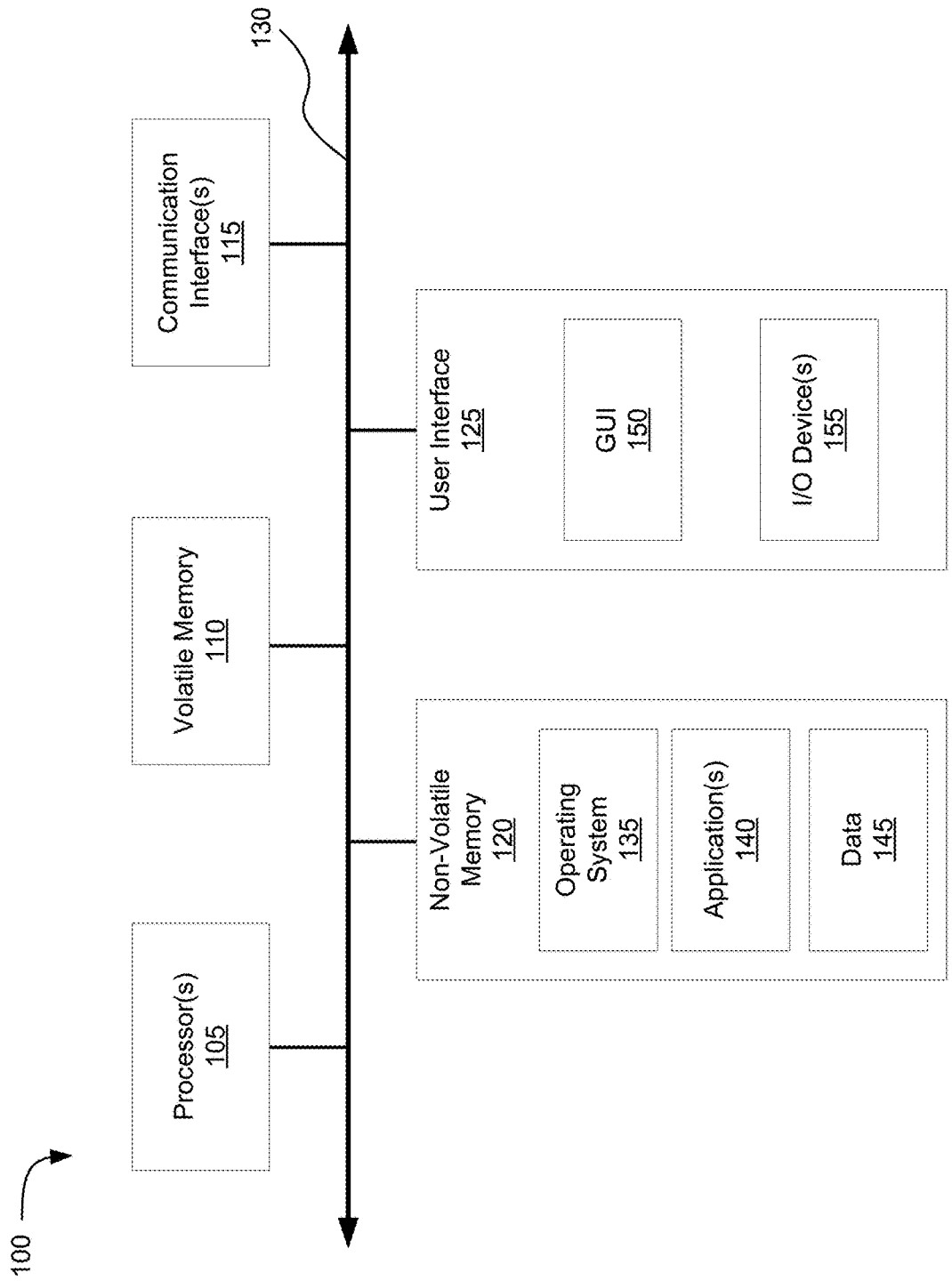
FIG. 1A is a block diagram of embodiments of a computing device.

The features and advantages of the present solution shall become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods for generating visualizations of data based on correlation measures and/or search history.

A. Computing Environment

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 130 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 135, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 130 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 135 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
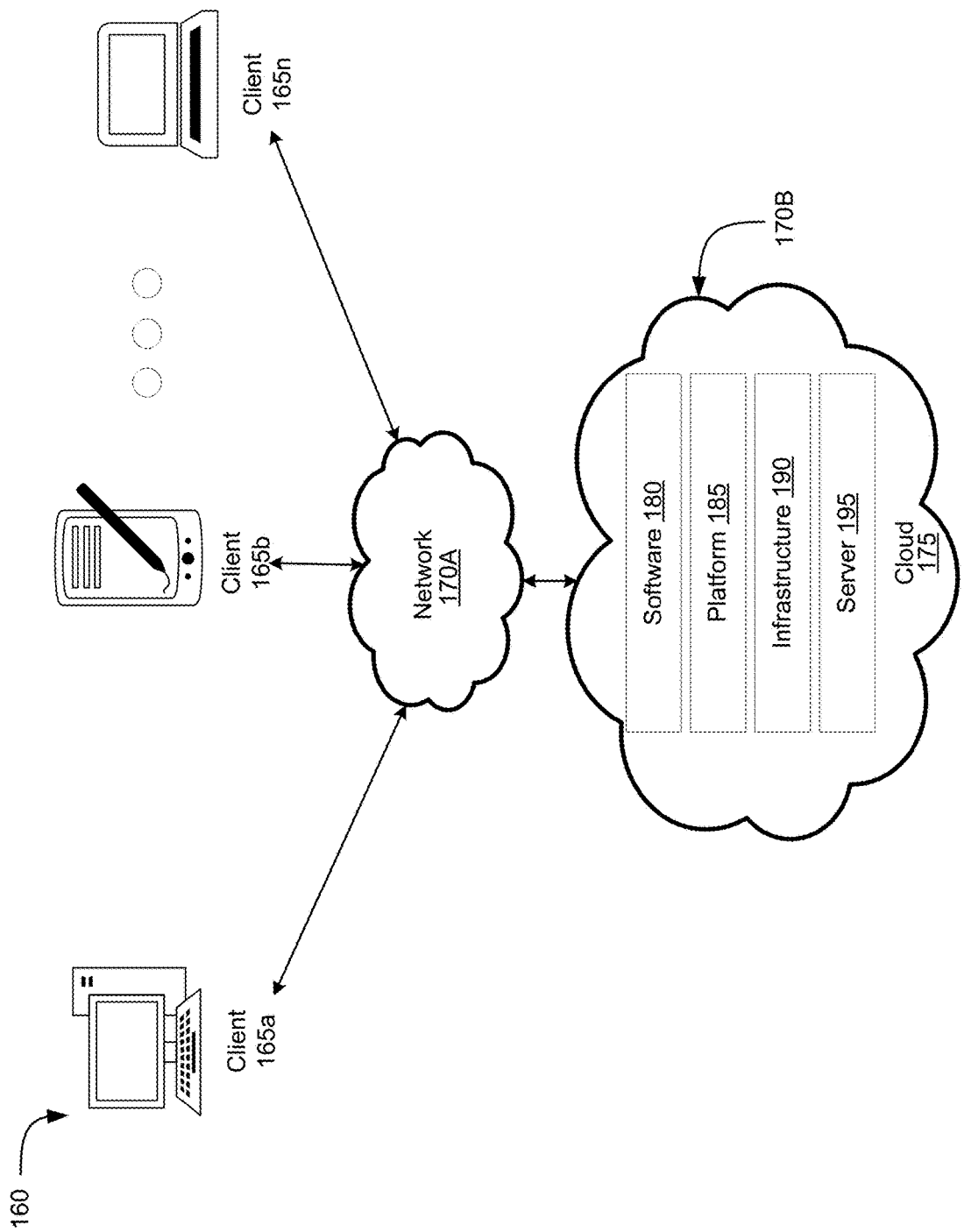
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170. Clients 165 may include, e.g., thick clients, thin clients, and zero clients. The cloud 108 may include back end platforms, e.g., servers, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 108 may include public servers that are maintained by third parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back end platforms, e.g., servers, storage, server farms or data centers. For example, the cloud 175 can include or correspond to a server or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 2:
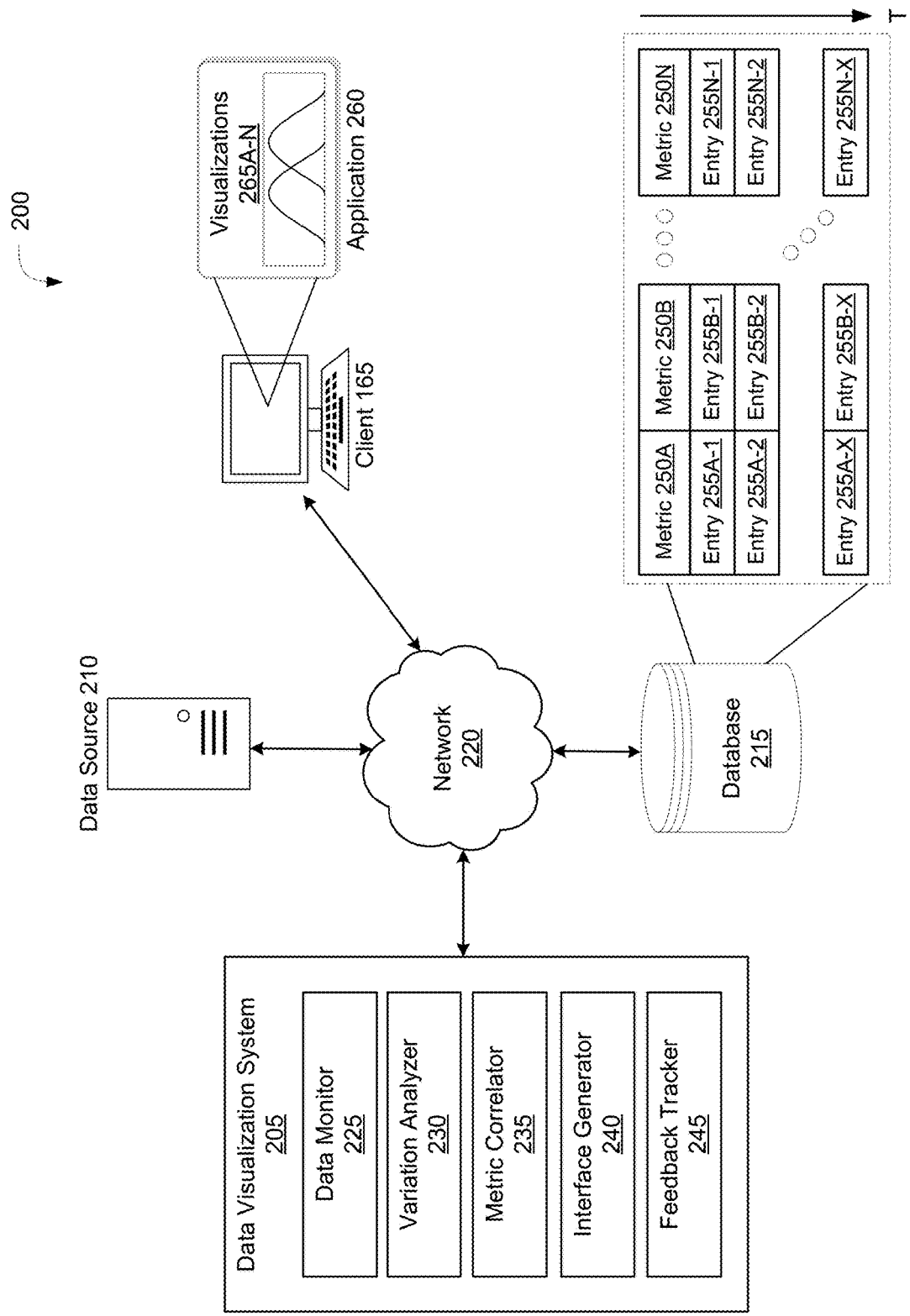
FIG. 2 is a block diagram of an example embodiment of a system for generating visualizations of data based on correlation measures and/or search history.

B. Systems and Methods for Generating Visualizations of Data Based on Correlation Measures and/or Search History Referring now to FIG. 2, depicted is a block diagram of an embodiment of a system 200 for generating visualizations of data based on correlation measures and/or search history. In overview, the system 200 may include at least one client 165, at least one data visualization system 205, at least one data source 210, at least one database 215, and/or at least one network 220. The client 165 in the system 200 may be one of the clients 165*a-n* from system 160. The data visualization system 205 may be executing on the client 165 or another device (e.g., a computing device 100, the server 195, or the cloud 175). The data visualization system 205 may include at least one data monitor 225 (sometimes referred herein as a monitoring engine), at least one variation analyzer 230 (sometimes referred herein as an analysis engine), at least one metric correlator 235 (sometimes referred herein as a correlation engine), at least one interface generator 240, and at least one feedback tracker 245 (sometimes referred herein as a feedback engine), among others. The client 165 may include or execute at least one application 260 to render one of a set of visualizations 265A-N (hereinafter generally referred to as visualizations 265). The network 220 may be an instance of the network 170A or 170B, and may communicatively couple the client 165, the data visualization system 205, the data source 210, and/or the database 215 to one another.

Each of the above-mentioned elements or entities is implemented in hardware, or a combination of hardware and software, in one or more embodiments. Each component of the system 200 may be implemented using hardware or a combination of hardware or software detailed above in connection with FIG. 1. For instance, each of these elements or entities can include any application, program, library, script, task, service, process or any type and form of executable instructions executing on hardware of the system 200, such as the data visualization system 205 (including the data monitor 225, the variation analyzer 230, the metric correlator 235, the interface generator 240, and/or the feedback tracker 245), the data source 210, the database 215, and/or the client 165. The hardware includes circuitry such as one or more processors and/or memory in one or more embodiments.

In further detail, the data source 210 may store and maintain data on the database 215. The data stored and maintained on the database 215 may be time-series data. The database 215 may include a set of metrics 250A-N (hereinafter generally referred herein to as metrics 250) and a set of value entries 255A-1 to 255N-X (hereinafter generally referred to as entries 255). Each metric 250 may define or correspond to a dimension within which the associated entries 255 reside. Each entry 255 may be associated with at least one of metrics 250, and may be arranged over time (or another parameter such as sample or sequence number) within the dimension defined by the metric 250. In some embodiments, the database 215 may be a relational database, such as a column-based database, a row-based database, a key-value database. For example, as depicted, the database 215 may be a columnar database, and may be part of a column-oriented database management system (DBMS). In the data of the database 215, each of the metrics 250 may form the columns and the associated entries 255 may be arranged within the corresponding column. In some embodiments, the functionalities of the data source 210 in storing and maintaining the database 215 may be performed by the data monitor 225 of the data visualization system 205.

To maintain the database 215, the data source 210 may add, create and/or generate the entries 255 over time for each metric 250. In generating the data (e.g., metrics 250), the data source 210 may detect, identify, or otherwise observe one or more events and objects over time. Events may include an occurrence of a set of actions, and may include, for example, a user interaction, a weather event, a traffic incident, a function call, or a speech dialogue, among others. Objects may include an existence of an entity or item, and may, for example, include a physical body, a building, flora, a network packet, or an instantiated variable among others. Each event or object may have one or more attributes (sometimes referred herein as quantities, traits, or properties) that can characterize the event or object, such as an amount, a volume, a strength, a weight, a length, a time duration, among others.

As each event or object is observed, the data source 210 may measure or instrument the event or object to identify, calculate, generate and/or otherwise determine the one or more attributes. From the same event or object, the data source 210 may determine or identify multiple attributes. Which attributes are to be determined may be predefined by the data source 210. Each identified or determined attribute may correspond to or form one of the metrics 250 in the data of the database 215. In some embodiments, the data source 210 may identify a time stamp corresponding to a time of the measurement. Based on each attribute, the data source 210 may generate an entry 255 for the corresponding attribute. The entry 255 may include a value corresponding to the attribute and may be defined within the corresponding metric 250. For example, the data source 210 may identify a set of request and response packets. From this identification, the data source 210 may measure a return trip time (for the set of request and response packets) as one entry 255 for corresponding to a first metric 250A, and a processing time as one entry 255 corresponding to a second metric 250B. With the generation of the entry 255, the data source 210 may write or record onto the database 215 under the associated metric 250. In some embodiments, the data source 210 may also store the timestamp associated with the measurement, with the entry 255.

The application 260 running on the client 165 may display or render a set of visualizations 265 for presentation of the data (e.g., one or more metrics 250) on the database 215. The application 260 may be a web application, a native application, or a program executable on the client 165 for the processing and presentation of data. In some embodiments, the application 260 may be a part of the data visualization system 205. In some embodiments, the application 260 may be separate from the data visualization system 205 in communication via the network 220 (e.g., as depicted to be running on the client 165). In some embodiments, the functionalities of the application 260 may be distributed across multiple devices connected via the network 220. Each visualization 265 may present entries 255 from a subset of the metrics 250 maintained on the database 215 over time. In some embodiments, each visualization 265 may include least one graphical plot, such as a bar chart, a line graph, a scatter plot, a histogram, a 3D plot, or any other diagram. The graphical plot may include at least one of the axes corresponding to the time (e.g., on the x-axis) and at least one of the axes may correspond to the subset of metrics 250 (e.g., on the y-axis). Each visualization 265 may correspond to or be a part of a graphical user interface (e.g., the GUI 150) of the application 260 for the presentation and rendering of the plot. For example, each plot of the visualization 265 may be on a separate tab within the application 260.

To navigate through the set of visualizations 265, the application 260 may provide one or more interface elements for display with which the user can interact (e.g., via I/O devices 155). The application 260 may receive or detect one or more interaction events corresponding to user interactions with at least one of the interface elements. For example, the user of the application 260 may interact with a tab corresponding to one of the visualizations 265 to switch from another visualization 265 and view another graphical plot. The application 260 may also include search capabilities to facilitate to navigate through the set of visualizations 265. For example, the graphical user interface of the application 260 may include a search field in the form of a textbox on which the user may enter, via one of the I/O devices 155, a search query. In some embodiments, the application 260 may also receive or detect search queries to access the entries 255 of the indicated metric 250 on the database 215. The application 260 may initially make available a set of default visualizations 265 to present the data. The default visualizations 265 and the number of default visualizations 265 in the initial set may be configured by the administrator of the application 260 and/or the data visualization system 205. The set of visualizations 265 accessible via the application 260 may be changed and updated by the data visualization system 205 in part using the interactions and/or search queries detected on the application 260, as detailed herein below.

The data monitor 225 executing on the data visualization system 205 may access the data observed by the data source 210 over time. In some embodiments, the data monitor 225 may access the database 215 maintained by the data source 210 to retrieve or identify the data, including the metrics 250 and the associated entries 255. In accessing the database 215, the data monitor 225 may extract or identify one or more of the metrics 250 defined by or in the database 215. For each identified metric 250, the data monitor 225 may extract or identify the entries 255 that are stored in the database 215 and associated with metric 250. Both the metric 250 and the associated entries 225 may be identified for additional processing by the data visualization system 205. As more and more data is generated, added and/or stored onto the database 215, the data monitor 225 may continue to extract and identify the new entries 255 from the database 215. In some embodiments, upon extracting the data from the database 215, the data monitor 225 may identify or mark the data source 210 that maintains the database 215 as being read or processed.

The data monitor 225 may determine or detect whether the data source 210 is, includes, or corresponds to a new source. For example, another data source 210 may become communicatively coupled with the data visualization system 205 via the network 220, subsequent to the data monitor 225 extracting data from an existing data source 210. In some embodiments, in performing the determination, the data monitor 225 may identify whether the data source 210 is previously marked as processed. When the data source 210 is identified as processed, the data monitor 225 may determine that the data source 210 is not a new source. On the other hand, when the data source 210 is identified as not processed, the data monitor 225 may determine that the data source 210 is a new source. The data monitor 225 may also store the data from the new data source 210 onto the database 215, and may initiate extraction of the data (e.g., the metrics 250 and/or entries 255) as detailed herein above.

In some embodiments, the data monitor 225 may determine whether the data source 210 includes at least one new metric 250 not yet read or processed. When the data source 210 is determined to include at least one new metric 250, the data monitor 225 may determine that the data source 210 is a new source. In addition, the data monitor 225 may store the data from the new data source 210 onto the database 215, and may initiate extraction of the data (e.g., the metrics 250 and entries 255) as detailed herein above. Conversely, when the data source 210 is determined to not include any new metrics 250, the data monitor 225 may determine that the data source 210 is not a new source. In some embodiments, the data monitor 225 may receive an indication message via the network 220 (e.g., from the client 165) that denotes or is used to identify the data source 210 as a new source. The indication message may also include an address (e.g., network address or web address) to the data source 210 with which the data monitor 225 can establish a connection. In response to receipt of the indication message, the data monitor 225 may determine the data source 210 as the new source. The data monitor 225 may also store the data from the new data source 210 onto the database 215, and may initiate extraction of the data (e.g., the metrics 250 and entries 255) as detailed herein above.

The variation analyzer 230 executing on the data visualization system 205 may calculate or determine at least one variation of each metric 250 in the data over time. The variation may capture, measure, indicate, or correspond to a change in the distribution of values of the entries 255 of the metric 250 over time. The variation (or change) of the metric 250 may be calculated as, for example, a variance, a standard deviation, a central moment, or an autocorrelation, among others. The higher the variation of the metric, the greater the distribution of values of the entries 225 may be. In contrast, the lower the variation of the metric, the lesser the distribution of values entries 225 may be. To calculate the variation of each metric 250, the variation analyzer 230 may use the entries 255 identified as associated with the metric 250. For example, the variation analyzer 230 may identify all the entries 255 in the column for the metric 250 in the database 215, and may calculate the standard deviation from the values of the identified entries 255. As more and more data for metric 250 is received and stored onto the database 215, the variation analyzer 230 may dynamically determine, track and/or record the variation of the metric 250. In some embodiments, upon detecting the data source 210 as a new source, the variation analyzer 230 may determine, track and/or record the variation of the metrics 250 in the data from the new data source 210.

The variation analyzer 230 may compare the variation of each metric 250 against a threshold variation. The threshold variation may demarcate or delineate a value of the variation at which to further process the entries 255 of the metric 250 in the database 215. In some embodiments, the threshold variation may be a predefined value. In some embodiments, the variation analyzer 230 may set or determine the threshold variation based on the variations determined across the metrics 250 of the database 215. For example, the threshold variation may be set by the variation analyzer 230 to select the top 10% to 20% of metrics 250 with the highest variations. When the variation for the metric 250 is determined to be greater than the threshold variation, the variation analyzer 230 may select the entries 255 of the metric 250 for further processing by the data visualization system 205. Conversely, when the variation for the metric 250 is determined to be less than or equal to the threshold variation, the variation analyzer 230 may refrain from selecting the entries 255 of the metric 250 for further processing by the data visualization system 205.

The metric correlator 235 executing on the data visualization system 205 may calculate or determine at least one correlation measure between at least a grouping (e.g., pairs, triplets, or any p number of metrics 250 with p<n where n is the total number of metrics 250) of metrics 250 in the data over time. The correlation measure may measure, indicate, or correspond to an association or a dependence between the values of the entries 255 in one metric 250 with the values of the entries 255 in another metric 250. The correlation measure among the subset of metrics 250 may be calculated as, for example, a correlation coefficient (e.g., Pearson correlation coefficient or a rank correlation), a covariance, a cross-correlation, or a mutual information, among others. The higher the correlation measure between two metrics 250, the greater the likelihood of dependency or association between the values of the entries 255 in one metric 250 with the values of the entries 225 in another metric 250 may be. In contrast, the lower the correlation measure between two metrics 250, the lesser the likelihood of dependency or association between the values of the entries 255 in one metric 250 with the values of the entries 225 in another metric 250 may be.

To calculate the correlation measures, the metric correlator 235 may identify the entries 255 from at least two of the metrics 250 from the database 215. In some embodiments, the metric correlator 235 may identify a subset of metrics 250 with variations determined to be greater than the threshold variation for instance. From the identified subset, the metric correlator 235 may form, generate, or identify one or more groupings of metrics 250 from the database 215. Each grouping may include a pair, a triplet, or any p number of metrics 250, and may also include the entries 255 arranged in the respective metrics 250. For each grouping of metrics 250, the metric correlator 235 may identify one set of entries 255 from one metric 250 and the other set of entries 255 from the other metric 250. Using the values of the entries 255 in each metric 250 in the grouping, the metric correlator 235 may calculate or determine the correlation measure for the grouping of metrics 250. The metric correlator 235 may repeat the determination of the correlation measure for each identified grouping from the grouping of metrics 250.

The interface generator 240 executing on the data visualization system 205 may manage the set of visualizations 265 to be rendered via the client 165. In some embodiments, the interface generator 240 may be part of the metric correlator 235, and the functionalities of the interface generator 240 may be executed by the metric correlator 235. The interface generator 240 may configure the application 260 running on the client 165 with the initial or default set of visualizations 265. Each visualization 265 in the default set may include the graphical plots of the data from the database 215 defined by the developer of the application 160. For example, the administrator of the application 160 may define the initial set of visualizations 265 with particular graphical plots with the expectation that the user on the client 165 desires these types of plots of the aggregated data. In some embodiments, the initial set of visualizations 265 may have been previously generated or established by the interface generator 240. In certain embodiments, the application 260 is not configured with an initial or default set of visualizations 265.

In managing the set of visualizations 265, the interface generator 240 may re-configure, modify, update or generate at least one visualization 265 for presentation of the data on the database 215. In some embodiments, the update or generation of the visualization 265 may be dynamic and may be in response to detecting the data source 210 is a new source or has new data. With the determination of the correlation measures, the interface generator 240 may compare the correlation measure of each grouping of metrics 250 with at least one reference level. The reference level may demarcate or delineate a value of the correlation measure at which to initiate, establish or modify at least one visualization 265 of the data presented (or to be presented) via the application 260. The reference level may include a predefined value or another correlation measure of another grouping of metrics 250.

The interface generator 240 may compare the correlation measure of each grouping of metrics 250 with the predefined value. The predefined value for the reference level may indicate a value at which to initiate or trigger a new visualization 265, or to switch or change one of the set of the visualizations 265 (e.g., one from the initial default set) accessible via the application 260. When the correlation measure for one grouping of metrics 250 is determined to be less than or equal to the predefined value, the interface generator 240 may maintain the set of visualizations 265 as is. On the other hand, when the correlation measure for one grouping of metrics 250 is determined to be greater than the predefined value, the interface generator 240 may select the grouping of metrics 250 for generation of the visualization 265. The interface generator 240 may traverse through the groupings of metrics 250, find the next grouping of metrics 250, and repeat the comparison.

Additionally, the interface generator 240 may compare the correlation measurements of each grouping of metrics 250 with another. The reference level compared against the correlation measure of one grouping of metrics 250 may be other correlation measures of other groupings of metrics 250. In some embodiments, the interface generator 240 may identify the set of visualizations 265 accessible via the application 260. Each visualization 265 may present or display the entries 255 from another grouping of metrics 250. For each identified visualization 265, the interface generator 240 may identify the correlation measure that is determined for the existing grouping of metrics 250 presented in the visualization 265. With the identification, the interface generator 240 may use the correlation measure to perform the comparison against other groupings of metrics 250. When the correlation measure for one grouping of metrics 250 is determined to be less than or equal to the reference level, the interface generator 240 may maintain the set of visualizations 265 as is. On the other hand, when the correlation measure for one grouping of metrics 250 is determined to be greater than the predefined value, the interface generator 240 may select the grouping of metrics 250 for generation or updating of the visualization 265. The interface generator 240 may traverse through the groupings of metrics 250, find the next grouping of metrics 250, and repeat the comparison.

With the selection of the groupings of metrics 250, the interface generator 240 may automatically generate a new visualization 265 using the entries 255 in each grouping of metrics 250. In some embodiments, the generation of the new visualization 265 may be in response to detecting the data source 210 as a new source. In generating the new visualization 265, the interface generator 240 may access the database 215 to retrieve or identify the entries 255 from the metrics 250 included in the grouping. Based on the values in the entries 255, the interface generator 240 may create instructions for rendering at least one graphical plot using the entries 255 of the selected grouping of metrics 250. For example, based on the comparison of the correlation measures against a reference level, the interface generator 240 may select a grouping including the first metric 250A and the second metric 250B. With this selection, the interface generator 240 may create instructions to display for instance a scatter plot with data points from entries 255A-1 to 255A-X from the first metric 250A and entries 255B-1 to 255B-X from the second metric 250B. In some embodiments, the interface generator 240 may remove or replace one of the visualizations 265 with the new visualization 265 generated from the entries 255 of the grouping of metrics 250. The previous visualization 265 that is to be replaced may have been generated using the entries 255 of another grouping of metrics 250, the correlation measure of which the grouping of metrics 250 for the new visualization 265 is compared against.

With the generation, the interface generator 240 may provide the new visualization 265 to the application 260 for presentation of the entries 255 of the metrics 250 in the corresponding grouping. The application 260 in turn may make available the new visualization 265 provided by the interface generator 240. The application 260 may make the new visualization 265 accessible via the interface elements of the graphical user interface for the application 260. For example, the application 260 may add a new tab (or thumbnail or icon) within the graphical interface for the new visualization 265. The user may click on the new tab (or thumbnail or icon) to access and view the data presented in the new visualization 265. The application 260 may make the new visualization 265 accessible via the search capability of the application 260. For example, the user may also enter a search query through the search feature included in the application 260 to pull up the new visualization 265 available through the application 260. The application 260 may include one or more event listeners to process the interactions and to provide detection of the interactions with the data visualization system 205.

The feedback tracker 245 executing on the data visualization system 205 may detect one or more interactions associated with the set of visualization 265 displayable via the application 260. In some embodiments, the feedback tracker 245 may receive interaction events via the one or more event listeners on the application 260. The interaction events may include, for example, user interactions (e.g., performed via the I/O devices 155) with the graphical user interface of the application 260 with at least one of the set of visualizations 265 and search queries performed via the search functionality of the application 260, among others. Using the detected interactions, the feedback tracker 245 may determine a user behavior (or response) of the user with each visualization 265 in the set accessible via the application 260. The user behavior may measure or indicate a degree or level of interest on the part of the user of the application 260 with the corresponding visualization 265 (e.g., including the presented metrics 250).

In determining the user behavior for each visualization 265, the feedback tracker 245 may count or identify a number of positive interactions and/or a number of negative interactions from the detected interactions with the visualization 265. The number of positive interactions may include user interactions indicating interest in the visualization 265, such as selecting the interface element to view the visualization 265, an interaction with the visualization 265, performing a search related to one or more of the metrics 250 used to generate the visualization 265, and selecting the search result (e.g., to access information related to the metrics 250, or to access the visualization 265), among others. The number of negative interactions may include user interactions indicating lack of interest in the visualization 265, such as dismissing or minimizing the interface element for the visualization 265, lack of any interaction with the visualization 265, performing a search unrelated to any of the metrics 250 used to generate the visualization 265, and not selecting a search result related to the metrics 250 or the visualization 265, among others. The feedback tracker 245 may determine the level of interest for the user behavior with respect to each visualization 265 based on the number of positive interactions and/or the number of negative interactions with the visualization 265.

Based on the one or more user behaviors, the feedback tracker 245 may configure, set, or modify the set of visualizations 265 to be accessible via the application 260. To modify, the feedback tracker 245 may change the selection of the groupings of metrics 250 used to generate one or more of the visualizations 265. In some embodiments, for each grouping of metrics 250, the feedback tracker 245 may compare the level of interest indicated in the user behavior against a threshold level. The threshold level may delineate a level of interest at which to select or unselect the grouping of metrics 250 for presentation as one of the set of visualizations 265 accessible via the application 260. Using the comparison, the feedback tracker 245 may indicate to the interface generator 240 (or the metric correlator 235) to maintain or refrain at least one of the visualizations 265 for presentation of the grouping of metrics 250. The maintenance or refraining of the visualization 265 may be at a subsequent time. When the level of interest for a grouping of metrics 250 is determined to be less than or equal to the threshold level, the feedback tracker 245 may unselect the grouping of metrics 250 from presentation. Furthermore, the feedback tracker 245, in conjunction with the interface generator 240, may refrain from presenting the visualization 265 for the unselected grouping of metrics 250. On the other hand, when the level of interest for a grouping of metrics 250 is determined to be greater than threshold level, the feedback tracker 245 may maintain the selection of the groupings of metrics 250 for presentation. Also, the feedback tracker 245, in conjunction with the interface generator 240, may continue to maintain the visualization 265 for the selected grouping of metrics 250.

In some embodiments, the feedback tracker 245 may adjust or alter the correlation measure for each grouping of the metrics 250 based on the user behavior of the visualization 265 for presentation of the entries 255 of the grouping of metrics 250. In some embodiments, the feedback tracker 245 may calculate or determine a weight as a function of the number of positive interactions and/or the number of negative interactions with the visualization 265 for the grouping of metrics 250. The weight may be used to adjust or change the correlation measure for the corresponding grouping of metrics 250. Upon determination, the feedback tracker 245 may provide the weight for the grouping of metrics 250 to the metric correlator 235 or interface generator 240 to adjust or change the respective correlation measure (e.g., by addition or by multiplication). In some embodiments, the feedback tracker 245 may provide the interface generator 240 to use or apply the weight in the comparison of the correlation measures of the groupings of metrics 250 against the reference level. For example, prior to comparing with the reference level, the interface generator 240 may add or multiply the weight with the corresponding correlation measure to change the value thereof. Upon applying the weight, the interface generator 240 may perform the comparison of the adjusted correlation measure with the reference level to determine whether to select the associated grouping of metrics 250.

In this manner, the data visualization system 205 may rank, prioritize and/or select different visualizations 265 of the data to be accessible based on the correlation metrics across different groupings of metrics 250 and on the user behavior with existing visualizations 265. By ranking and/or selecting using such factors, the data visualization system 205 may provide the visualizations 265 with data more likely to be viewed and used by the user of the application 260 displaying the visualizations 265. As a result, the back-and-forth process of manually requesting the developer of the application 260 to create new ways of visualizing data may be reduced if not eliminated. Furthermore, new sources of data (e.g., the data source 210) may be easily and readily incorporated into the visualizations 265, without manual oversight by the administrator. With greater use of the data presented via the visualizations 265, the human-computer interaction (HCI) between the application 260 and the user may be also improved.

Figure 3:
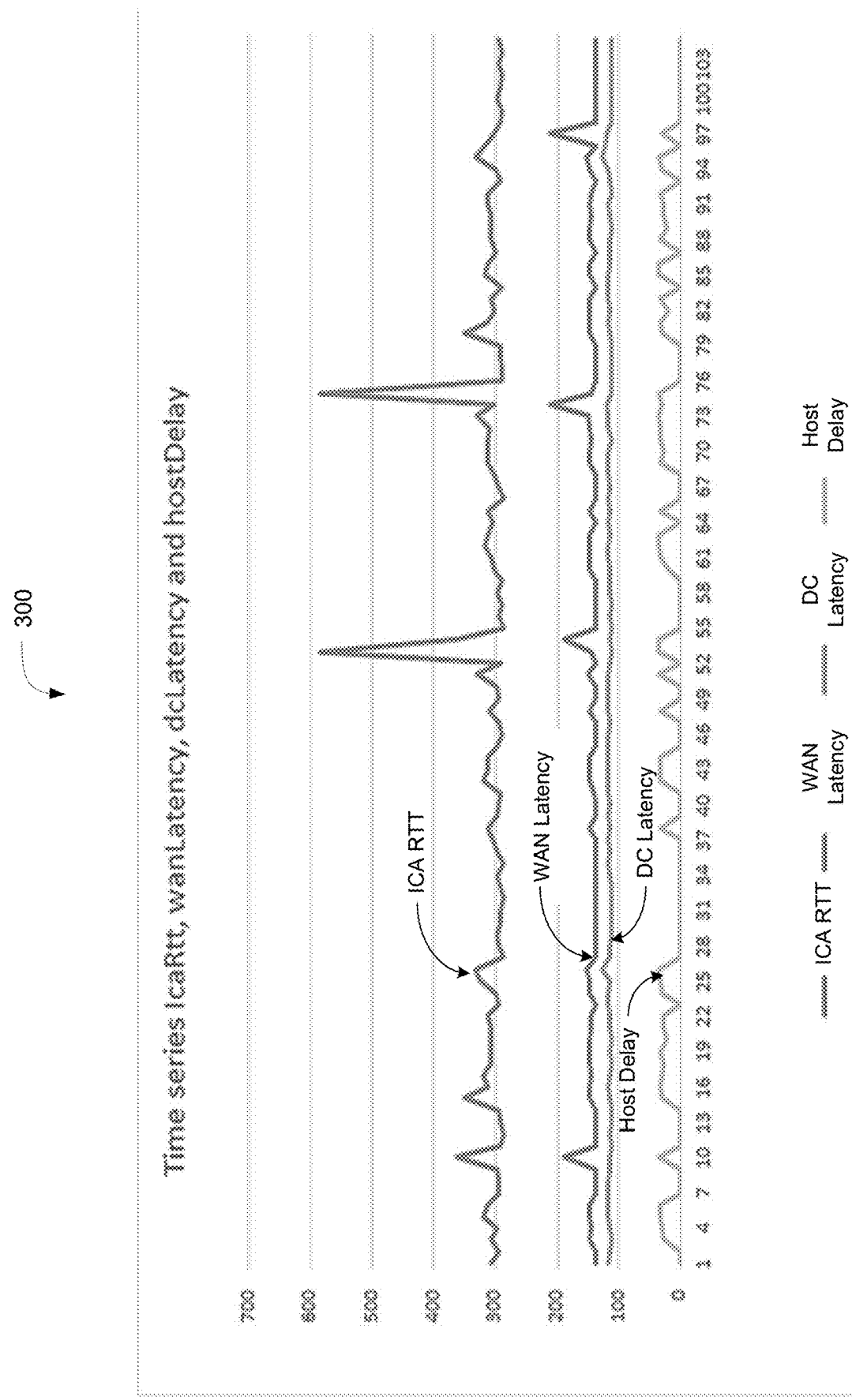
FIG. 3 is a screenshot of an example graph of data generated using the system for generating visualizations of data based on correlation measures and search history.

Referring now to FIG. 3, depicted is an example graph 300 of data generated using the system for generating visualizations of data based on correlation measures and search history. The graph 300 may correspond to one of the visualizations 265 of the data generated by the data visualization system 205. In the example depicted, the graph 300 may include various metrics 250 regarding communication of packets through an network, such as Independent Computing Architecture (ICA) round trip time (RTT), wide-area network (WAN) latency, data center (DC) latency, and host delay. As shown, these metrics 250 may have some degree of correlation, with peaks and troughs occurring roughly at similar times.

Figure 4:
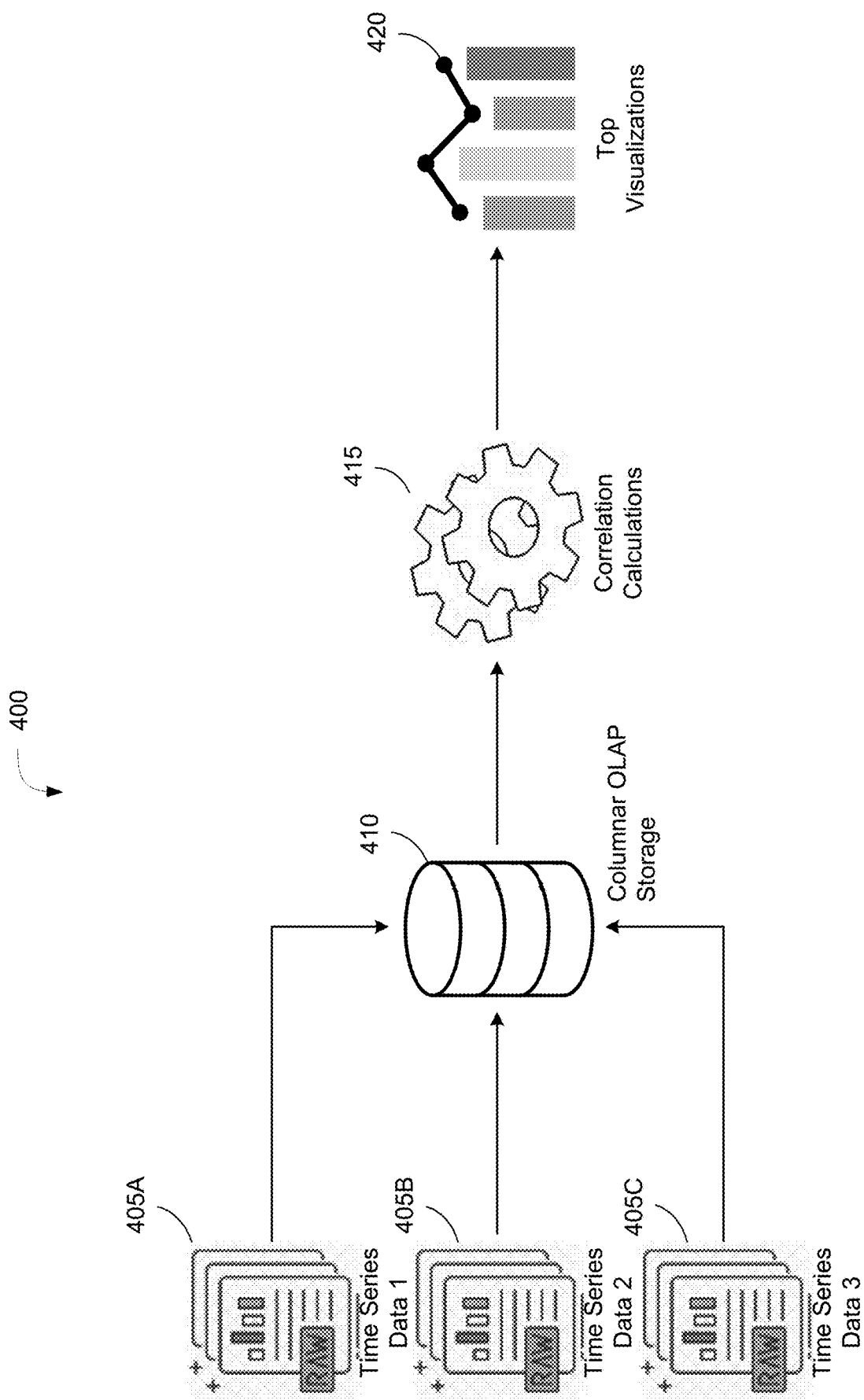
FIG. 4 is an example activity diagram showing visualizations of data being generated based on correlation measures and/or search history.

Referring now to FIG. 4, depicted is an activity diagram for generation of visualizations of data based on correlation measures and/or search history. The sequence 400 may be performed by the components described in FIG. 1 and FIG. 2, the system 100, and/or the system 200 detailed above. Under the sequence 400, multiple sets of time-series data may be acquired (405A-C). The acquired time-series data may be stored and maintained on a columnar online analytic processing (OLAP) storage (410). Correlation calculations may be performed on the time-series data maintained on the storage (415). Based on the correlation calculations, the top visualizations including the corresponding time-series data may be selected for presentation (420).

Figure 5:
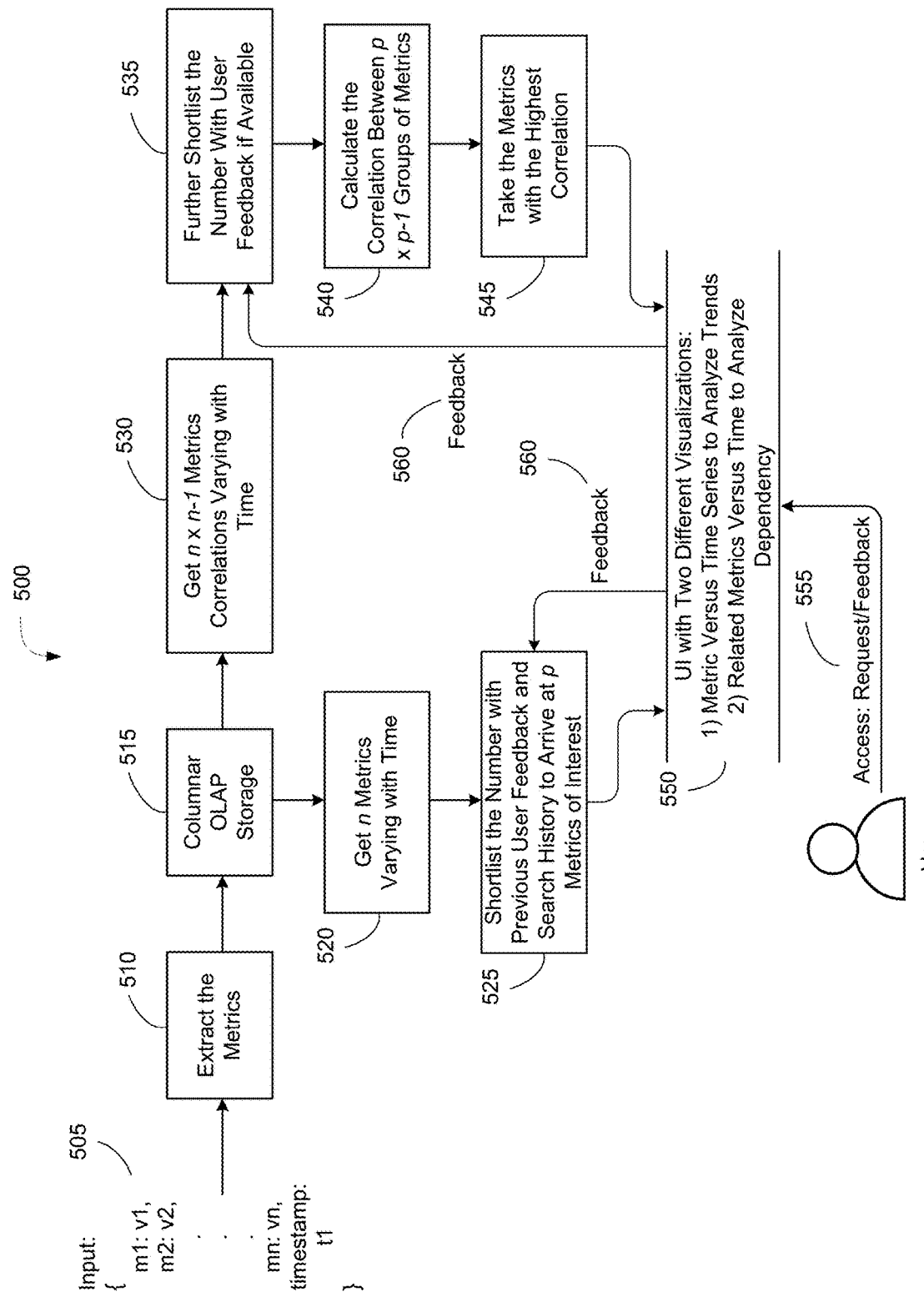
FIG. 5 is a sequence diagram of an example embodiment of a process for generating visualizations of data based on correlation measures and search history.

Referring now to FIG. 5, depicted is a sequence diagram of a process 500 for generating visualizations of data based on correlation measures and search history. The process 500 may be performed by the components described in FIG. 1 and FIG. 2, the system 100, and/or the system 200 detailed above. Under the process 500, a time-series data may be aggregated and acquired (505). From the time-series data, the metrics may be extracted from the input time-series data (510). Using the metrics, the time-series data may be stored and arranged in a columnar OLAP storage (515). From the storage, n metrics that vary in time may be obtained (520). If feedback is available, the number of metrics may be reduced based on previous user feedback and search history to arrive at p<n metrics of interest (525). Furthermore, n×n−1 metrics with correlations varying over time may be obtained (530). If feedback is available, the number of metrics may be reduced based on previous user feedback and search history (535). The correlation of p×p−1 groups of metrics may be calculated (540). From the calculation, the metrics with the highest correlations may be selected (545). Using the shortlisted number of metrics, a user interface with different visualizations may be displayed (550). The visualizations may include, for example: (1) a metric versus time-series data to analyze trends and (2) a related metrics versus time to analyze dependency. A user may interact with the interface by requesting various data or providing other feedback (555). The feedback may be used to shortlist or reduce the number of metrics selected for the generation of the visualization (560), and various functions of the sequence 500 may be repeated.

Figure 6:
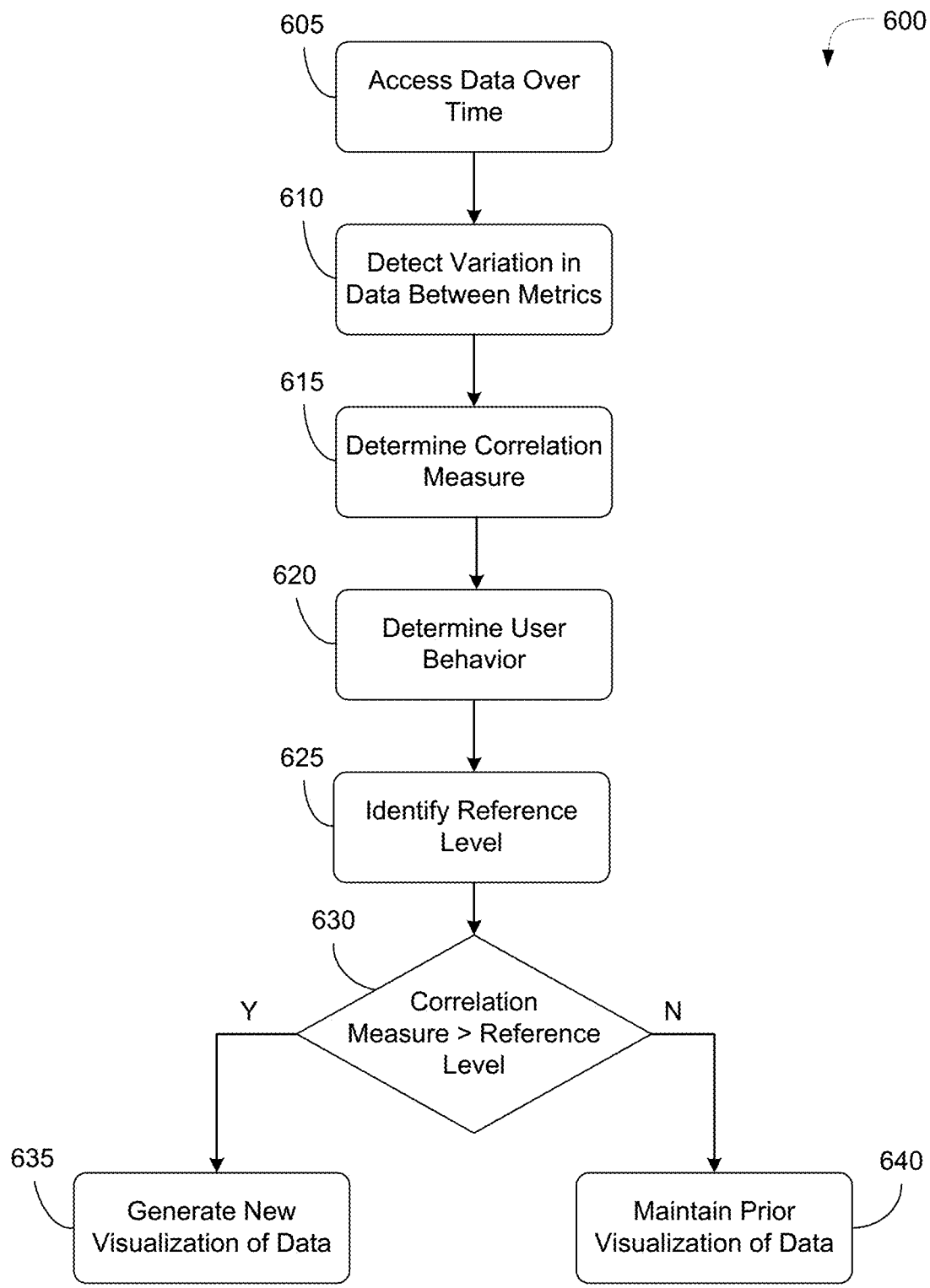
FIG. 6 is a flow diagram of an example embodiment of a method for generating visualizations of data based on correlation measures and search history.

Referring now to FIG. 6, depicted is a flow diagram of an example embodiment of a method 600 of generating visualizations of data based on correlation measures and/or search history. The operations and functionalities of the method 600 may be performed by the components described in FIG. 1 and FIG. 2, the system 100, and/or the system 200 detailed above. In brief overview, a computing device may access data over time (605). The computing device may detect or record a variation in the data between metrics (610). The computing device may determine a correlation measure (615). The computing device may identify a reference level (625). The computing device may determine whether the correlation measure is greater than the reference level (630). If the correlation measure is greater than the reference level, the computing device may generate a new visualization of data (635). Otherwise, if the correlation measure is less than or equal to the reference level, the computing device may maintain a prior visualization of data (640).

In further detail, a computing device (e.g., the data visualization system 205) may access data over time (605). The data may originate from a data source (e.g., the data source 210) and may be stored and maintained on a database (e.g., the database 215). The data may be time-series data, and may include a collection of entries (e.g., the entries 255) arranged among a set of metrics (e.g., the metrics 250). The computing device may access the database to retrieve the data maintained thereon, and may identify the individual metrics and the entries associated with each metric in the database.

The computing device may detect a variation in the data between metrics (610). The computing device may calculate the variation (e.g., a variance or a standard deviation) of the entries for a given metric from the database. The variation may indicate a change in the distribution of values in the data for metric over time. To determine whether to further process the data of the metric, the computing device may for instance determine whether the calculated variation is above a threshold variation. If the calculated variation is greater than the threshold, the computing device may continue to process the entries of the metric. Otherwise, if the calculated variation is less than or equal to the threshold, the computing device may halt or refrain from further processing of the entries of the metric.

The computing device may determine a correlation measure (615). The computing device may calculate the correlation measure (e.g., Pearson correlation coefficient or a rank correlation) of entries across two or more metrics. The two or more metrics may constitute or form a grouping of metrics. The correlation measure may indicate a dependency or association of values between multiple metrics in the data. To calculate the correlation measure, the computing device may identify the entries from metrics with variations determined to be above the threshold. The computing device may determine the correlation measure across the entries of the metrics.

The computing device may determine a user behavior (620). The computing device may determine the user behavior (e.g., response, interaction or reaction) of a user with a visualization (e.g., the visualization 265) specific for the presentation of the grouping of metrics. The user behavior may indicate a level of interest or a lack of interest with a particular visualization. The computing device may identify the user behavior (if any) using event listeners of an application used to render the visualization. Based on the types of interactions, the computing device may determine the user behavior. Once determined, the computing device may use the level of interest indicated by the user behavior to weight, adjust, or alter the ranking, importance, relevance and/or correlation measure of the grouping of metrics associated with the visualization.

The computing device may identify a reference level (625). The computing device may identify the reference level to compare against the correlation measure of the grouping of metrics. The reference level may delineate a value of the correlation measure at which to include or exclude the grouping of metrics from visualization. The reference level may be a predefined level or another correlation measure of another grouping of metrics. The computing device may identify the correlation measure of a grouping of metrics with an existing visualization accessible for presentation.

The computing device may determine whether the correlation measure is greater than the reference level (630). Once the reference level is identified, the computing device may compare the correlation measure against the reference level. If the correlation measure is greater than the reference level, the computing device may generate a new visualization of data (e.g., the visualization 265) (635). The computing device may identify the entries associated with the metrics of the grouping, and may generate the visualization of the data. Each visualization may include a graphical plot of the values of the entries in the metrics. The computing device may replace one of the visualizations with the newly generated visualization. Otherwise, if the correlation measure is less than or equal to the reference level, the computing device may maintain a prior visualization of data (e.g., the visualization 265) (640), e.g., refrain from generating and/or adding a new visualization.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
   accessing, by at least one processor, data observed from a data source over time;
   determining, by the at least one processor, that a variation of at least a first metric or a second metric of the data over time is greater than a threshold;
   determining, by the at least one processor responsive to determining that the variation is greater than the threshold, that a correlation measure between the first metric and the second metric over time is greater than a reference level;
   selecting, by the at least one processor responsive to determining that the correlation measure is greater than the reference level, the first metric and the second metric for visualization;
   generating, by the at least one processor, responsive to selection, a visualization of the first metric and the second metric varying in time, on a device to display to a user;

determining, by the at least one processor, a level of
interest for at least one of the first metric or the second
metric according to a number of user interactions with
the visualization;

modifying, by the at least one processor, the correlation
measure between the first metric and the second metric
based at least on the level of interest; and updating, by the at least one processor, the visualization
in accordance with the modified correlation measure.

2. The method of claim 1, further comprising:
detecting, by the at least one processor, that the data
source comprises a new data source; and
dynamically generating, by the at least one processor
responsive to the new data source, the visualization of
the first metric and the second metric varying in time,
to display to the user.

3. The method of claim 1, comprising accessing the data observed from the data source over time, from a columnar database.

4. The method of claim 1, further comprising:
determining, by the at least one processor, a variation of
a third metric of the data over time; and
determining, by the at least one processor, whether a
correlation measure between the first metric and the
third metric over time, is less than the correlation
measure between the first metric and the second metric
over time.

5. The method of claim 4, comprising generating, by the at least one processor responsive to the correlation measure between the first metric and the third metric being less than the correlation measure between the first metric and the second metric, the visualization of the first metric and the second metric varying in time, to display to a user.

6. The method of claim 4, comprising generating, by the at least one processor responsive to the correlation measure between the first metric and the third metric over time being higher than the correlation measure between the first metric and the second metric over time, a visualization of the first metric and the third metric varying in time, to display to the user.

7. The method of claim 1, further comprising:
detecting, by the at least one processor, that the data
source is a new data source; and
storing, by the at least one processor, the data from the
data source over time.

8. The method of claim 1, further comprising:
detecting, by the at least one processor, that a behavior of
the user is indicative of insufficient interest in the
visualization of the first metric and the second metric
varying in time; and
indicating, by the at least one processor, to refrain from
displaying the visualization of the first metric and the
second metric at a future time, or to display a different
visualization at the future time.

9. The method of claim 8, wherein the behavior of the user comprises at least one of: dismissing or minimizing the displayed visualization, performing a search unrelated to the first metric or the second metric, or a lack of interaction with the displayed visualization.

10. A device, comprising:
memory configured to store data observed from a data
source over time; and
at least one processor configured to:
access data observed from a data source over time;
determine that a variation of at least a first metric or a
second metric of the data over time is greater than a
threshold;
determine, responsive to determining that the variation
is greater than the threshold, that a correlation measure between the first metric and the second metric
over time is greater than a predefined reference level;
and
select, responsive to the determination that the correlation measure is greater than the predefined reference level, the first metric and the second metric for
visualization;
generate, responsive to the selection, a visualization of
the first metric and the second metric varying in time,
to display to a user;
determine a level of interest for at least one of the first
metric or the second metric according to a number of
user interactions with the visualization;
modify the correlation measure between the first metric
and the second metric based at least on the level of
interest; and
update the visualization in accordance with the modified correlation measure.

11. The device of claim 10, wherein the at least one processor is further configured to:
detect that the data source comprises a new data source; and
dynamically generate, responsive to the new data source,
the visualization of the first metric and the second
metric varying in time, to display to the user.

12. The device of claim 10, wherein the memory is configured to store the data in a columnar database; and
wherein the at least one processor is further configured to
access the data observed from the data source over
time, from the columnar database.

13. The device of claim 10, wherein the at least one processor is further configured to:
determine a variation of a third metric of the data over
time; and
determine whether a correlation measure between the first
metric and the third metric over time, is less than the
correlation measure between the first metric and the
second metric over time.

14. The device of claim 13, wherein the at least one processor is configured to generate, responsive to the correlation measure between the first metric and the third metric being less than the correlation measure between the first metric and the second metric, the visualization of the first metric and the second metric varying in time, to display to a user.

15. The device of claim 13, wherein the at least one processor is configured to generate, responsive to the correlation measure between the first metric and the third metric being higher than the correlation measure between the first metric and the second metric, a visualization of the first metric and the third metric varying in time, to display to the user.

16. The device of claim 10, wherein the reference level comprises a predefined value, or a correlation measure between another pair of metrics of the data.

17. The device of claim 10, wherein the at least one processor is further configured to:
detect that the data source is a new data source; and
store the data from the data source over time.

18. The device of claim 10, wherein the at least one processor is further configured to:
detect that a behavior of the user is indicative of insufficient interest in the visualization of the first metric and
the second metric varying in time; and refrain from displaying the visualization of the first metric and the second metric at a future time, or display a different visualization at the future time.

19. A non-transitory computer readable medium storing program instructions for causing one or more processors to:
   access data observed from a data source over time;
   determine that a variation of at least a first metric or a second metric of the data over time is greater than a threshold;
   determine, responsive to determining that the variation is greater than the threshold, that a correlation measure between the first metric and the second metric over time is greater than a reference level; and
   select, responsive to determining that the correlation measure is greater than the reference level, the first metric and the second metric for visualization;
   generate, responsive to selecting, a visualization of the first metric and the second metric varying in time, to display to a user;
   determine a level of interest for at least one of the first metric or the second metric according to a number of user interactions with the visualization;
   modify the correlation measure between the first metric and the second metric based at least on the level of interest; and
   update the visualization in accordance with the modified correlation measure.

* * * * *